Sept. 12, 1967 P. AEMMES 3,341,782

SYSTEM FOR NOISE REDUCTION IN F-M TELEGRAPH SIGNALS

Filed Aug. 15, 1963

3,341,782

SYSTEM FOR NOISE REDUCTION IN F-M TELEGRAPH SIGNALS

Peter Aemmer, Zurich, Switzerland, assignor to Albiswerk Zurich A.G., Zurich, Switzerland, a corporation of Switzerland Filed Aug. 15, 1963, Ser. No. 302,428
Claims priority, application Switzerland, Aug. 15, 1962, 9,771/62
16 Claims. (Cl. 329—112)

Figures 1, 2, 3, 4:
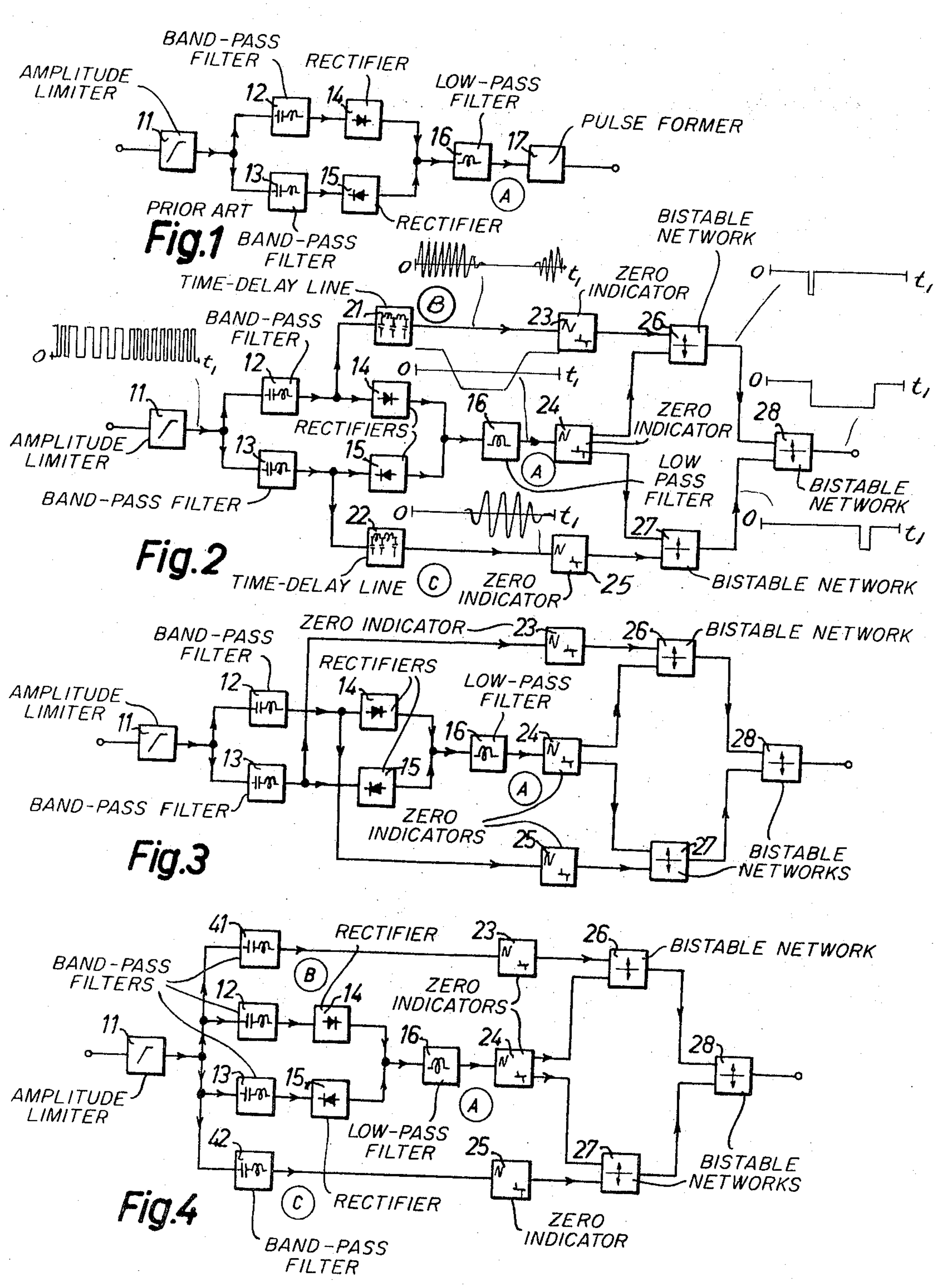

My invention relates to receiving systems for frequency-modulated telegraph or code signals and has for its general object the elimination of signal distortion and other disturbances generally designated as noise.

In telegraph systems operating with frequency modulation, a signal at one frequency corresponds to a mark and at the other a space. The received two-frequency signals, hereinafter also called "two-tone" F-M signals although not necessarily limited to frequencies in the audible range, are supplied to a discriminator network, if necessary after amplification and amplitude limitation. The discriminator network has two output circuits which issue two respective, mutually complementary alternating-current signals. After rectification, these signals are supplied to another network which, by forming a difference between the two single-current input magnitudes, produces double-current output signals for use in a printer or other read-out device.

In telegraph code signals the shift from one to the other frequency can take place instantaneously. However, the transmission path for such signals, particularly the receiving system, comprises filters which more or less flatten the flanks, or leading and trailing edges, of the individual signals. This manifests itself in the frequency shift of the received signals, after they have passed through the detection stage, exhibiting a more or less gradual transition. Since the frequencies of the signals, following the limiting stage in the receiving system, are affected by static disturbances, the time point of the undisturbed, original frequency shift is no longer ascertainable.

Similar problems are involved in other applications of two-tone frequency modulation, such as in infrared (IR) tracking of movable targets in conjunction with spatial filtering. In such systems, the IR-radiator whose bearings are to be ascertained is projected upon a disc or screen, and the position of the image is scanned by rotating scanner discs in accordance wtih the desired positional coordinates. A spoke pattern of alternately bright and dark strips is superimposed upon the scanning figure. In systems of this type, a point-type radiator results in a pulse sequence, whereas an area-type radiator, depending upon its shape and extent, produces a more or less constant direct-current signal.

By suitable choice of the scanning figure, the resulting pulse conditions permit a direct conclusion as to the cartesian coordinates. Such spoke patterns issue at the exit of the image chopper (scanner) an output in form of signal trains which, in analogy to two-tone telegraphy, can be coupled out in form of frequency-modulated signals. The utilization of such two-tone signals can likewise be effected in accordance with the techniques employed in two-tone telegraphy. The individual coordinates, for example, result from the relation of pulse length to pulse gap. Disadvantages are the static disturbances which manifest themselves as a noise superimposed upon the signals proper. For accurately measuring the location of the IR-radiator, the frequency shift must be accurately ascertainable with respect to its time point of occurrence. Consequently, the shift must occur with a steepest possible voltage change.

This, however, can be achieved only if the band-pass filters for the respective two frequencies can respond to start and stop of oscillation with sufficient rapidity and therefore have a sufficiently large band width. For sufficiently uniform space filtering, the ratio of the two frequencies must not be too large, preferably smaller than 2. A good compromise between the relative band width of the band-pass filters and the frequency ratio for space filtering is the frequency ratio 1:1.5. This permits attaining relative band widths of 30%. A greater frequency shift without change in band widths would result in improving the signal-to-noise ratio. For this reason, no attempt towards most favorable space filtering is made in the known equipment of this type, and a frequency ratio of 1:4 has been chosen.

It is an object of my invention to provide a method and system for reducing noise in two-tone frequency modulated signals after their detection, that, for purposes of the above-mentioned type, secures a more reliable noise elimination conjointly with an increased signal-to-noise ratio.

For achieving this objective and in accordance with my invention, I take into account that the frequency shifts in the original two-tone F-M code signals always take place at a singular point of the oscillation waves. For example, assume that the frequency modulation involves sudden shifts from the frequency $f_1$ to the frequency $f_2$. The starting function for the particular case under observation can be looked upon as being composed of a continuous oscillation at the frequency $f_1$, a second oscillation of the same frequency and the same amplitude but opposed phase occurring suddenly at the moment of frequency shift, and a third oscillation at the frequency $f_2$ suddenly occurring at the same moment of shift. Consequently, the signal voltage, as constituted by the continuous component, remains continuous at the time point of the frequency shift.

Now, according to a feature of my invention, I derive a pulse sequence from the two frequencies of the two-tone F-M signal and apply the pulses from one of these derived sequences for fixing the time points at which in the received and detected code signals the shifts from high to low frequency as well as the shift from low to high frequency take place.

In order that the present invention may be readily carried into effect, it will be further described and explained with reference to the accompanying drawing, in which:

FIG. 1 is a block diagram of the known discriminator circuit in a two-tone F-M telegraph receiving system; and FIGS. 2, 3 and 4 show respective block diagrams of three different embodiments of discriminator networks in receiving systems according to the invention.

The embodiments described hereinafter are particularly suitable for use in infrared measuring devices for determining the bearings of an IR-radiator in cartesian coordinates. The spoke pattern of the space-filter chopper figure can be dimensioned so that the oscillations at the frequency shift follow each other abruptly, i.e. without sloping transition.

The known discriminator network according to FIG. 1 for the detection of two-tone frequency-modulated signals comprises an amplitude limiter stage 11 which is supplied with the incoming signals from suitable receiving equipment. From the limiter, the signals pass through two parallel connected band-pass filters 12 and 13 and thence through respective rectifiers 14 and 15. The rectified signals are added and pass through a low-pass filter 16 to a pulse-former stage 17.

The functioning at the moment of the shift in signal frequency is the following: The signal oscillates at the frequency $f_1$ passing through the band-pass filter 12.

This produces a positive direct voltage as the output of the rectifier 14. As long as only the frequency $f_1$ is effective, the output voltage of the rectifier 15 is 0 volt. When the signal shifts to the frequency $f_2$, the band-pass filter 13 passes the oscillations, and a negative voltage is built up at the rectifier 15. Simultaneously, the oscillations of the band-pass filter 12 decay, and the positive direct voltage output of the rectifier 14 decreases. The rectifiers 14 and 15 are connected in series relation with respect to each other. For that reason the sum voltage appears at the junction point of the low-pass filter 16, and this sum voltage changes from a positive value to a negative value during the frequency shift just mentioned. The low-pass filter 16 acts as a screening or blocking device for the direct current. The pulse-former 17 is a bistable circuit, for example a Schmitt-trigger which remains in one stable condition when its control and input voltage is positive and snaps to the other condition when the control voltage is negative. The bistable circuit 17 therefore is triggered to switch abruptly from one to the other condition at the moment when the sum voltage at the junction point A passes through the zero value. Thus the pulse-former 17 reproduces in the receiver the original binary mark-space code signal.

In a known system of the type described above with refrence to FIG. 1 it has been found that, with a statistical stray-frequency distribution, the zero passages of the rectified signals exhibit a much larger amount of stray than the zero passages of the tone oscillations. Although this observation, at a first glance, may appear contrary to expectation, it is explainable by the particular physical conditions involved. The two-tone frequency modulation constitutes an abrupt change in frequency of an oscillation and consequently of the angular speed of the voltage vector. After amplitude limitation, the statistic unsteadiness or stray manifests itself in small spontaneous changes in angular speed of the same voltage vector. The ratio of the small changes resulting from unsteadiness or instability to the large changes resulting from the modulation, is necessarily never smaller than the ratio of the small changes in angular speed to the angular speed itself.

This recognition is utilized in the noise-reducing receiver system according to the invention shown in FIG. 2. The rectification of the received and amplitude-limited signal is effected in the same manner as in the system of FIG. 1, namely by means of the amplitude limiter 11, the band-pass filters 12 and 13, the rectifiers 14 and 15, and the low-pass filter 16. However, respective voltages are branched off from the band-pass filters 12 and 13 and are supplied to respective time-delay lines 21 and 22. The three resulting voltages from delay line 21, filter 16 and delay line 22 are passed to respective zero indicators 23, 24 and 25. Two bistable networks 26 and 27 are controlled by the output signals of these zero indicators. The output signals from the bistable networks 26 and 27 control another bistable network 28. The bistable networks 26, 27 and 28 may consist of any suitable flip-flop or trigger combination such as the one mentioned above with respect to unit 17 in FIG. 1.

In the system of FIG. 2, the voltage at the point A is employed for selecting the one of the zero passages in the original signal which appears as the first one at the point B or C subsequent to the zero passage at point A. This zero passage, selected from a pulse sequence, then determines the zero passage of the rectified signal. When the frequency shift at point A is indicated, a band-pass filter for the appertaining frequency is in oscillation-decaying codition and has lost a considerable amount of its signal energy. Consequently, the uncertainty of the zero passages in the pulse sequence has become greater than when this band-pass filter is in normal oscillation. The time constant of the delay lines 21 and 22 is so chosen that the zero passages employed for determining the frequency shift are not affected by the frequency shift.

The functioning of the system is as follows:

The zero indicator 23 connected to the delay line 21 is a network which at each zero passage from the negative to the positive half-wave issues a short positive pulse. Analogously, the zero indicator 25 issues a similar negative pulse for each zero passage from the positive to the negative half-wave. The zero indicator 24 issues at each zero passage a pulse alternately to one or the other of its two output leads. In full oscillating condition at the frequency $f_1$, the zero indicator 23 furnishes approximately periodic pulses. As a result, the bistable flip-flop 26 is continuously in a given switching condition which, for example, may be designated as "closed." At the moment of frequency shift from $f_1$ to $f_2$, the bistable flip-flop 26 receives a pulse from the zero indicator 24 and thus "opens." The next pulse from the zero indicator 23 causes the bistable flip-flop 26 to trigger back to its closed condition. A differentiating member and a rectifier connected to the output of the flip-flop 26, pass to the flip-flop 28 only the pulses produced by the switching of the flip-flop 26 to its closed condition. The pulses from the bistable stage 26 switch the bistable stage 28 to its closed condition.

The bistable stage 27 operates in the manner corresponding to stage 26 and furnishes an output pulse at each frequency shift from $f_2$ to $f_1$. Such a pulse causes the bistable stage 28 to open. Consequently, the voltage coupled from the output circuit of the bistable network 28 corresponds to the voltage point A is much less subjected to the frequency-stray effect, i.e. reproduces to a much better degree of perfection the flank steepness of the original telegraph signals.

The system shown in FIG. 3 corresponds exactly to that of FIG. 2 except that the time-delay lines 21 and 22 are omitted and the pulse sequences for determining the moment of frequency shift are taken from the signal whose oscillations have just reached full amplitude. To make this possible, the zero passage at voltage point A must be sufficiently delayed. This can readily be secured by corresponding dimensioning of the low-pass filter 16. The advantage of the system according to FIG. 3 resides in utilizing the fact that such low-pass filter acts as a delay line. The system of FIG. 2 requires two delay lines 21 and 22 in order to bypass the delaying effect of the low-pass filter 16 as well as the time required for the oscillations to build up in the band-pass filters 12 and 13. Furthermore, the delay lines must be given a much wider band than the low-pass filter and consequently involve correspondingly more material and space.

The system according to FIG. 4 is applicable particularly in cases where it is known from the arriving signal that, after a frequency shift, it remains in the new frequency condition a certain minimum of time which is considerably longer than the time required for the oscillations in the band-pass filters 12 and 13 to build-up and decay. The system of FIG. 4 is provided with additional band-pass filters 41 and 42 so dimensioned that they have built-up their oscillations sufficiently, for example at least 90%, during the time interval of a continuous signal. This permits giving the band-pass filters 41 and 42 a considerably smaller band width than the filters 12 and 13. The improvement of the signal-to-noise power ratio, with respect to the entire receiving system, is inversely proportional to the hand-width ratio of the band-pass filters 41 to 12 and 42 to 13. For satisfactory filter characteristics (for example, Butterworth) the group delay of the band-pass filters 41 and 42 is chosen to be just large enough so that the signals at the voltage points B and C sufficiently reach full oscillation amplitude before a frequency shift can be indicated again at the point A at the earliest.

Null indicators such as 23, 24 and 25 are described for example in the book "Pulse and Digital Circuits" by Millman and Taub, published 1956, on page 480. The well known Schmitt-trigger may also be used. Bistable multivibrators such as 26, 27 and 28 are disclosed in the abovementioned Millman and Taub book on page 147.

Upon a study of this disclosure, it will be obvious to those skilled in the art, that my invention permits of various modifications with respect to arrangement and number of components and circuitry, and hence can be given embodiments other than particularly illustrated and described herein, without departing from the essential features of my invention and within the scope of the claims annexed hereto.

I claim:

1. A system for reducing noise in a receiver for receiving two-tone frequency modulated signals, comprising
   first demodulator means for demodulating the received signals;
   second demodulator means connected to said first demodulator means, said second demodulator means including pulse forming means for deriving a pulse sequence from one of said received signal frequencies and time delay means for delaying said pulse sequence; and
   output means connected to the pulse forming means of said second demodulator means for determining by pulses from said pulse sequence alternating time points of frequency shifts of received signals from high to low and from low to high frequency.

2. A system for reducing noise in a receiver for receiving two-tone frequency modulated signals, comprising
   first demodulator means for demodulating the received signals, said first demodulator means including amplitude limiting means having an output and band-pass filter means connected to the output of said amplitude limiting means;
   second demodulator means connected to said first demodulator means, said second demodulator means including band-pass filter means having a narrower band width than the band-pass filter means of said first demodulator means and having an input connected to the output of said amplitude limiting means and an output, and pulse forming means for deriving a pulse sequence from one of said received signal frequencies connected to the output of the band-pass filter means of said second demodulator means; and
   output means connected to the pulse forming means of said second demodulator means for determining by pulses from said pulse sequence alternating time points of frequency shifts of received signals from high to low and from low to high frequency.

3. A system for reducing noise in a receiver for receiving two-tone frequency modulated signals, comprising
   first demodulator means for demodulating the received signals to produce a demodulated signal;
   second demodulator means connected to said first demodulator means, said second demodulator means including pulse forming means for deriving a pulse sequence from one of said received signal frequencies and coupling means coupling said pulse forming means to said first demodulator means, said coupling means comprising time delay means for delaying said pulse sequence; and
   output means connected to the pulse forming means of said second demodulator means for producing an output signal in response to the pulse sequence derived by said pulse forming means, said output means including bistable circuit means set by the demodulated signal produced by said first demodulator means.

4. A system for reducing noise in a receiver for receiving two-tone frequency modulated signals, comprising
   first demodulator means for demodulating the received signals;
   second demodulator means connected to said first demodulator means, said second demodulator means including pulse forming means for deriving a pulse sequence from each of said two received signal frequencies; and
   output means connected to the pulse forming means of said second demodulator means for determining by alternate pulses from said two pulse sequences time points of frequency shifts of received signals from high to low and from low to high frequency.

5. A system for reducing noise in a receiver for receiving two-tone frequency modulated signals, comprising
   first demodulator means for demodulating the received signals;
   second demodulator means connected to said first demodulator means, said second demodulator means including pulse forming means for deriving a pulse sequence from each of said two received signal frequencies and time delay means for delaying said pulse sequences; and
   output means connected to the pulse forming means of said second demodulator means for determining by alternate pulses from said two pulse sequences time points of frequency shifts of received signals from high to low and from low to high frequency.

6. A system for reducing noise in a receiver for receiving two-tone frequency modulated signals, comprising
   first demodulator means for demodulating the received signals, said first demodulator means including amplitude limiting means having an output;
   second demodulator means connected to said first demodulator means, said second demodulator means including pulse forming means for deriving a pulse sequence from each of said two received signal frequencies and coupling means coupling said pulse forming means to the output of said amplitude limiting means; and
   output means connected to the pulse forming means of said second demodulator means for determining by alternate pulses from said two pulse sequences time points of frequency shifts of received signals from high to low and from low to high frequency.

7. A system for reducing noise in a receiver for receiving two-tone frequency modulator signals, comprising
   first demodulator means for demodulating the received signals, said first demodulator means including amplitude limiting means having an output and band-pass filter means connected to the output of said amplitude limiting means;
   second demodulator means connected to said first demodulator means, said second demodulator means including band-pass filter means having a narrower band width than the band-pass filter means of said first demodulator means and having an input connected to the output of said amplitude limiting means and an output, and pulse forming means for deriving a pulse sequence from each of said two received signal frequencies; and
   output means connected to the pulse forming means of said second demodulator means for determining by alternate pulses from said two pulse sequences time points of frequency shifts of received signals from high to low and from low to high frequency.

8. A system for reducing noise in a receiver for receiving two-tone frequency modulator signals, comprising
   first demodulator means for demodulating the received signals to produce a demodulated signal;
   second demodulator means connected to said first demodulator means, said second demodulator means including pulse forming means for deriving a pulse sequence from each of said two received signal frequencies and coupling means coupling said pulse forming means to said first demodulator means, said coupling means comprising time delay means for delaying said pulse sequence; and
   output means connected to the pulse forming means of said second demodulator means for producing an output signal in response to each of the pulse sequences derived by said pulse forming means, said output means including bistable circuit means set by the demodulated signal produced by said first demodulator means.

9. A system for reducing noise in a receiver for receiving two-tone frequency modulated signals, comprising first demodulator means for demodulating the received signals and producing a signal at each change of frequency of said received signals;

second demodulator means connected to said first demodulator means, said second demodulator means including pulse forming means for deriving a pulse sequence from each of said two received signal frequencies and coupling means coupling said pulse forming means to said first demodulator means; and output means connected to the pulse forming means of said second demodulator means for producing an output signal in response to each of the pulse sequences derived by said pulse forming means, said output means including two bistable circuits each having inputs connected to a corresponding one of the pulse forming means of said second demodulator means and to said first demodulator means and an output, each of said two bistable circuits being set by said first demodulator means and triggered by the corresponding one of said pulse forming means, and a third bistable circuit having inputs connected to the outputs of said two bistable circuits for alternately responding by each of said two bistable circuits.

10. A system for reducing noise in a receiver for receiving two-tone frequency modulated signals, comprising first demodulator means for demodulating the received signals and producing a signal at each change of frequency of said received signals;

second demodulator means connected to said first demodulator means, said second demodulator means including pulse forming means for deriving a pulse sequence from each of said two received signal frequencies and coupling means coupling said pulse forming means to said first demodulator means, said coupling means comprising time delay means for delaying said pulse sequences; and output means connected to the pulse forming means of said second demodulator means for producing an output signal in response to each of the pulse sequences derived by said pulse forming means, said output means including two bistable circuits each having inputs connected to a corresponding one of the pulse forming means of said second demodulator means and to said first demodulator means and an output, each of said two bistable circuits being set by said first demodulator means and triggered by the corresponding one of said pulse forming means, and a third bistable circuit having inputs connected to the outputs of said two bistable circuits for alternately responding by each of said two bistable circuits.

11. A system for reducing noise in a receiver for receiving two-ton frequency modulated signals, comprising first demodulator means for demodulating the received signals and producing a signal at each change of frequency of said received signals, said first demodulator means comprising signal amplitude limiting means, a low-pass filter, two circuit branches connected between said amplitude limiting means and said low-pass filter in parallel relation to each other, each of said circuit branches including a band-pass filter for passing the high and low frequencies of said received signals and a rectifier connecting said band-pass filter to said low-pass filter, said rectifier being connected with mutually opposite polarity relative to said low-pass filter;

second demodulator means connected to said first demodulator means, said second demodulator means including pulse forming means for deriving a pulse sequence from each of said two received signal frequencies; and output means connected to the pulse forming means of said second demodulator means for determining by alternate pulses from said two pulse sequences time points of frequency shifts of received signals from high to low and from low to high frequency.

12. A system for reducing noise in a receiver for receiving two-tone frequency modulated signals, comprising first demodulator means for demodulating the received signals and producing a signal at each change of frequency of said received signals, said first demodulator means comprising signal amplitude limiting means, a low-pass filter, two circuit branches connected between said amplitude limiting means and said low-pass filter in parallel relation to each other, each of said circuit branches including a band-pass filter for passing the high and low frequencies of said received signals and a rectifier connecting said band-pass filter to said low-pass filter, said rectifiers being connected with mutually opposite polarity relative to said low-pass filter;

second demodulator means connected to said first demodulator means, said second demodulator means including pulse forming means for deriving a pulse sequence from each of said two received signal frequencies and time delay means for delaying said pulse sequences; and output means connected to the pulse forming means of said second demodulator means for determining by alternate pulses from said two pulse sequences time points of frequency shifts of received signals from high to low and from low to high frequency.

13. A system for reducing noise in a receiver for receiving two-tone frequency modulated signals, comprising first demodulator means for demodulating the received signals and producing a signal at each change of frequency of said received signals, said first demodulator means comprising signal amplitude limiting means, a low-pass filter, two circuit branches connected between said amplitude limiting means and said low-pass filter in parallel relation to each other, each of said circuit branches including a band-pass filter for passing the high and low frequencies of said received signals and a rectifier connecting said band-pass filter to said low-pass filter, said rectifiers being connected with mutually opposite polarity relative to said low-pass filter;

second demodulator means connected to said first demodulator means, said second demodulator means including pulse forming means for deriving a pulse sequence from each of said two received signal frequencies and coupling means coupling said pulse forming means to said amplitude limiting means; and output means connected to the pulse forming means of said second demodulator means for determining by alternate pulses from said two pulse sequences time points of frequency shifts of received signals from high to low and from low to high frequency.

14. A system for reducing noise in a receiver for receiving two-tone frequency modulated signals, comprising first demodulator means for demodulating the received signals and producing a signal at each change of frequency of said received signals, said first demodulator means comprising signal amplitude limiting means, a low-pass filter, two circuit branches connected between said amplitude limiting means and said low-pass filter in parallel relation to each other, each of said circuit branches including a band-pass filter for passing the high and low frequencies of said received signals and a rectifier connecting said band-pass filter to said low-pass filter, said rectifiers being connected with mutually opposite polarity relative to said low-pass filter;

second demodulator means connected to said first demodulator means, said second demodulator means including band-pass filter means having a narrower band width than the band-pass filter means of said first demodulator means and having an input connected to the output of said amplitude limiting means and an output, and pulse forming means for deriving a pulse sequence from each of said two received signal frequencies; and output means connected to the pulse forming means of said second demodulator means for determining by alternate pulses from said two pulse sequences time points of frequency shifts of received signals from high to low and from low to high frequency.

15. A system for reducing noise in a receiver for receiving two-tone frequency modulated signals, comprising first demodulator means for demodulating the received signals and producing a signal at each change of frequency of said received signals, said first demodulator means comprising signal amplitude limiting means, a low-pass filter, two circuit branches connected between said amplitude limiting means and said low-pass filter in parallel relation to each other, each of said circuit branches including a band-pass filter for passing the high and low frequencies of said received signals and a rectifier connecting said band-pass filter to said low-pass filter, said rectifiers being connected with mutually opposite polarity relative to said low-pass filter;

second demodulator means connected to said first demodulator means, said second demodulator means including pulse forming means for deriving a pulse sequence from each of said two received signal frequencies and coupling means coupling said pulse forming means to said amplitude limiting means; and output means connected to the pulse forming means of said second demodulator means for producing an output signal in response to each of the pulse sequences derived by said pulse forming means, said output means including two bistable circuits each having inputs connected to a corresponding one of the pulse forming means of said second demodulator means and to said first demodulator means and an output, each of said two bistable circuits being set by said first demodulator means and triggered by the corresponding one of said pulse forming means, and a third bistable circuit having inputs connected to the outputs of said two bistable circuits for alternately responding by each of said two bistable circuits.

16. A system for reducing noise in a receiver for receiving two-tone frequency modulated signals, comprising first demodulator means for demodulating the received signals and producing a signal at each change of frequency of said received signals, said first demodulator means comprising signal amplitude limiting means, a low-pass filter, two circuit branches connected between said amplitude limiting means and said low-pass filter in parallel relation to each other, each of said circuit branches including a band-pass filter for passing the high and low frequencies of said received signals and a rectifier connecting said band-pass filter to said low-pass filter, said rectifiers being connected with mutually opposite polarity relative to said low-pass filter;

second demdulator means connected to said first demodulator means, said second demodulator means including coupling means connected to each of said band-pass filters and including pulse forming means for deriving a pulse sequence from each of said two received signal frequencies; and output means comprising two bistable circuits each having two inputs and an output, one of the inputs of each of said bistable circuits being connected to a corresponding one of each of said coupling means of said second demodulator means, further coupling means coupling the other of the inputs of each of said bistable circuits to the low-pass filter of said first demodulator means, and a third bistable circuit having two inputs each connected to the output of a corresponding one of said two bistable circuits for providing an output signal in response to pulses from said two bistable circuits.

References Cited

UNITED STATES PATENTS 2,652,451 9/1953 Feten ---------------- 178—66

HERMAN KARL SAALBACH, *Primary Examiner.*

ALFRED L. BRODY, *Examiner.*

PAUL L. GENSLER, *Assistant Examiner.*